(12) United States Patent
Mahdi

(10) Patent No.: US 8,333,539 B2
(45) Date of Patent: Dec. 18, 2012

(54) FASTENER

(76) Inventor: Mohammed Isa Mahdi, Logan Lake (CA)

(*) Notice: Subject to any disclaimer, the term of this patent is extended or adjusted under 35 U.S.C. 154(b) by 224 days.

(21) Appl. No.: 12/801,005

(22) Filed: May 17, 2010

(65) Prior Publication Data

US 2011/0280686 A1    Nov. 17, 2011

(51) Int. Cl.
*F16B 15/06* (2006.01)
*F16B 15/02* (2006.01)

(52) U.S. Cl. ............. 411/453; 411/456; 411/9; 411/923

(58) Field of Classification Search .................. 411/453, 411/454, 456, 451.3, 922, 923, 473, 9, 480
See application file for complete search history.

(56) References Cited

U.S. PATENT DOCUMENTS

| | | | | |
|---|---|---|---|---|
| 59,434 A | | 11/1866 | Merrill | |
| 382,676 A | * | 5/1888 | Alden | 411/473 |
| 398,260 A | | 2/1889 | Husted | |
| 464,144 A | | 12/1891 | Porter | |
| 510,035 A | * | 12/1893 | Lipe | 411/453 |
| 515,952 A | | 3/1894 | Curtis | |
| 549,555 A | * | 11/1895 | White | 411/456 |
| 578,100 A | | 3/1897 | Hay | |
| 767,521 A | | 8/1904 | Hurd | |
| 1,100,252 A | * | 6/1914 | O'Neill | 411/456 |
| 1,125,885 A | * | 1/1915 | Rouxel | 411/454 |
| 1,194,047 A | * | 8/1916 | Lynch | 411/453 |
| 1,330,906 A | * | 2/1920 | Schoenfeld | 411/456 |
| 1,473,497 A | | 11/1923 | Monckton | |
| 1,818,523 A | | 8/1931 | Ziedrich | |
| 1,853,488 A | | 4/1932 | Ziedrich | |
| 1,918,936 A | | 7/1933 | Shearman | |
| 2,168,854 A | | 8/1939 | Agnew | |
| 2,190,883 A | * | 2/1940 | Pauze | 411/453 |
| 2,327,556 A | * | 8/1943 | Purinton | 24/114.4 |
| 4,718,802 A | | 1/1988 | Rockenfeller et al. | |
| 5,642,974 A | | 7/1997 | Gabriel et al. | |
| 6,817,818 B2 | | 11/2004 | Farrell et al. | |
| 6,899,502 B2 | * | 5/2005 | Strunk | 411/469 |
| 7,063,491 B2 | | 6/2006 | French | |
| 7,819,614 B2 | * | 10/2010 | Versino et al. | 411/453 |
| 2009/0155020 A1 | | 6/2009 | Versino et al. | |

FOREIGN PATENT DOCUMENTS

| CA | 2307354 | 11/2001 |
|---|---|---|
| GB | 297768 | 5/1929 |

* cited by examiner

*Primary Examiner* — Flemming Saether
(74) *Attorney, Agent, or Firm* — Richard Okimaw

(57) ABSTRACT

Disclosed is a fastener comprising a central elongate shank extending between first and second ends. The first end of the shank has a tapered point. The second end a head has an annular shoulder disposed towards the second end. The fastener further comprises an opposed pair of spines extending helically along the shank and a plurality of hooks extending from each of the pair of opposed spines. Also disclosed is a protrusion extending axially with the shank from the head deformable into an anti-friction washer upon impact by a fastener driver.

13 Claims, 4 Drawing Sheets

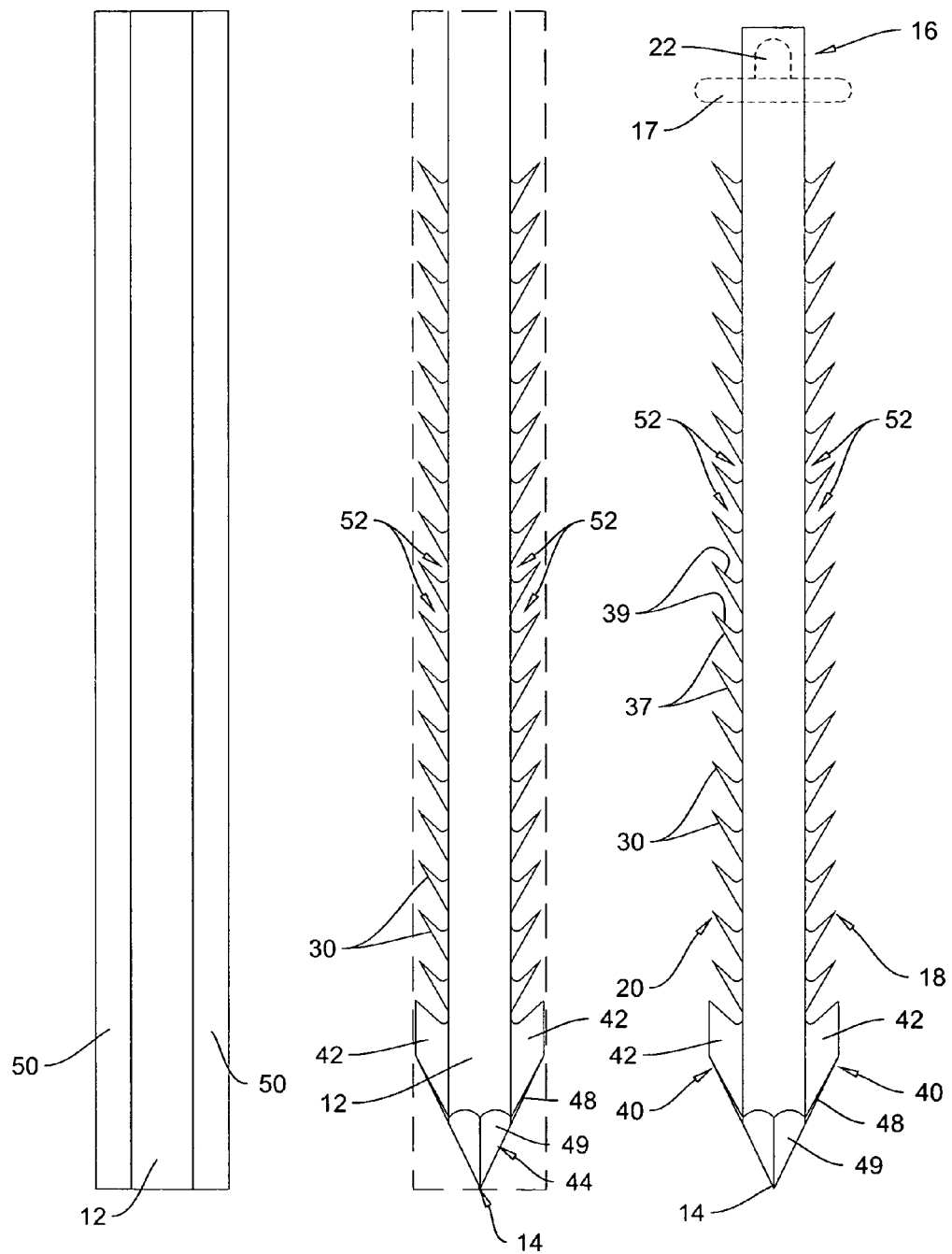

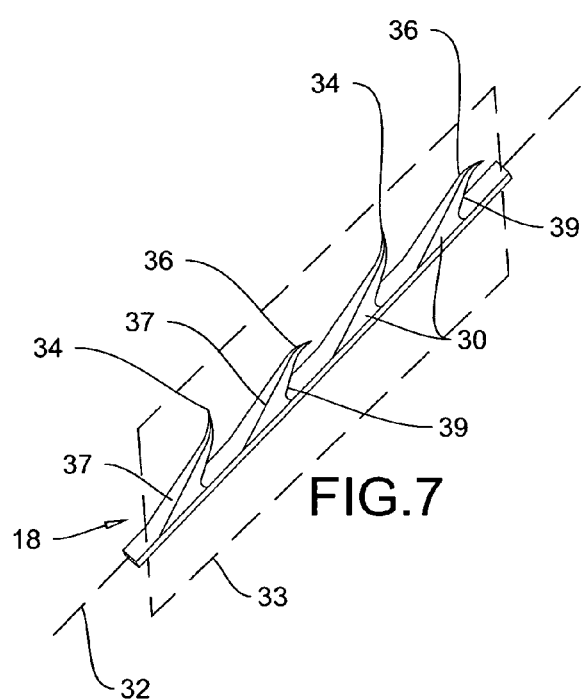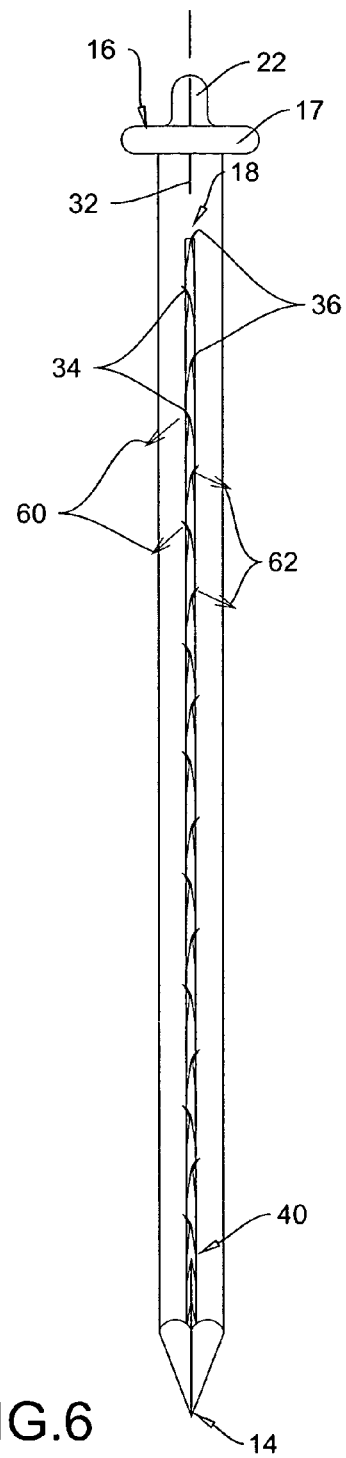

FASTENER

BACKGROUND OF THE INVENTION

1. Field of Invention

The present invention relates to fasteners in general and in particular to an improved fastener that is resistant to removal or pull-out.

2. Description of Related Art

Fasteners, such as nails, are well known for the purpose of securing articles of wood, plastic and the like together. Nails are elongate pin-shaped, sharp objects of hard metal or alloy having a sharpened end and a blunted or flared driving end.

Nails are typically driven into the work piece by a hammer, a pneumatic nail gun, or a small explosive charge or primer. A nail holds materials together by friction in an axial direction and shear strength laterally. Fasteners, such as nails, which are applied by an axial force are advantageously quick and easy to use. One limitation of nails, however is their reliance upon the friction between the nail on the wood surface to retain the nail in the material. Accordingly, nails may be prone to being axially displaced within the material which is also known as being pulled out.

Screws are also well known fasteners, however it is well known that screws are more difficult and time consuming to apply as they are required to be twisted or torque into the material. In particular, many screws are required to be axially rotated a plurality of times while being driven into the material. This is both time consuming and labor intensive. Screws also typically have a single helical thread extending therearound.

Other attempts to provide fasteners having improved pull out performance have provided circumferential rings or ridges around the shank of the nail or spiraled planar surfaces surrounding the shank of the nail, also referred to as screw-shank nails. Such attempts have similarly been limited in the resistance of the nail to pull out as the nail does not engage a surface area of the material into which it is applied that is a significantly larger than the circumference of the nail itself.

SUMMARY OF THE INVENTION

According to a first embodiment of the present invention there is disclosed a fastener comprising a central elongate shank extending between first and second ends. The first end of the shank has a tapered point. The second end has a head having an annular shoulder disposed towards the second end. The fastener further comprises an opposed pair of spines extending along the path of a double-alpha helix along the shank and a plurality of hooks extending from each of the pair of opposed spines.

The plurality of hooks may have sharpened tips oriented towards the second end of the shank. The spines and the hooks may be formed from a planar member defining a double-alpha helix plane around the shank. The plurality of hooks may be curved out of the double-alpha helix plane of the spines. The tips of the plurality of hooks may be disposed to opposed alternating sides of the spines. The plurality of hooks may have flexible tips.

The spines may extend radially from the shank. The spines may have a constant angle of inclination about the shank. The spines may include a directional self-tapping blade oriented at an angle corresponding to the angle of inclination about the shank proximate to the first end of the shank. The spines may extend 360 degrees around the shank between the first and second ends of the shank. The spines may extend less than 360 degrees around the shank between the first and second ends of the shank.

The fastener may further include a protrusion extending axially with the shank from the head. The protrusion may be frangibly connected to the head. The protrusion may be formed of a more ductile material than the head. The protrusion may be deformable into an anti-friction slip washer upon impact by a fastener driver. The washer may be separable from the head upon rotation of the shank and head.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

FIG. 3 is a front view of a blank for forming the fastener of FIG. 1 at a first stage.

FIG. 4 is a front view of a blank for forming the fastener of FIG. 1 at a second stage.

FIG. 5 is a front view of a blank for forming the fastener of FIG. 1 at a third stage.

FIG. 6 is a side view of a blank for forming the fastener of FIG. 1 at a third stage.

FIG. 7 is a perspective view of a portion of one of the spines having a plurality of hooks of the fastener of FIG. 1.

DETAILED DESCRIPTION

Figure 1:
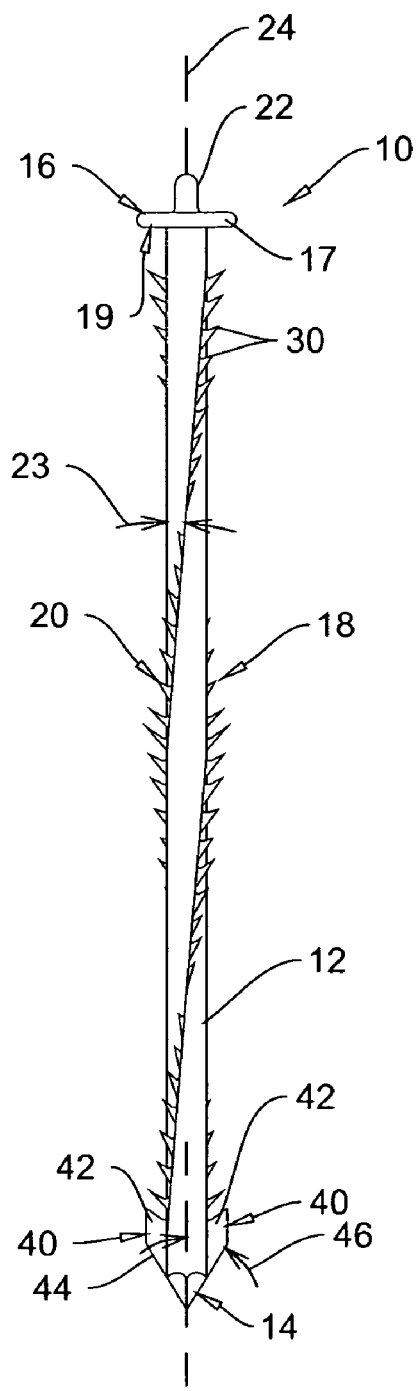
FIG. 1 is a side elevational view of a fastener according to a first embodiment of the present invention.

Referring to FIG. 1, a fastener according to a first embodiment of the invention is shown generally at 10. The fastener 10 has an elongate central shaft or shank 12 extending between a first or sharpened end 14 and a second or driving end 16. The fastener 10 includes first and second spines 18 and 20 extending therealong. The first and second spines 18 and 20 are located to opposed sides of the shank 12 and spiral around the shaft along a double-alpha helix path as will be more fully described below. The first and second spines 18 and 20 each include a plurality of protrusions or hooks 30 having pointed ends oriented towards the driving end 16 of the fastener.

The shank 12 may have a round cross section, as are common in the art although it will be appreciated that other cross-sections may also be useful, such as, by way of non-limiting example, oval, square or rectangular. In embodiments having a non-round cross section, the cross section shape may twist around the shank in correspondence with the first and second spines such that the location of the spine on the cross-sectional shape will remain constant along the length of the shank. Optionally, the cross section may remain at a constant radial orientation around the shank while the spines twist therearound along a double-alpha helix path.

The path of each spine has an angle of inclination, generally indicated at 23 relative to an axis 24 of the shank 12. The angle of inclination 23 of the spines 18 and 20 is constant along the length of the shank. As illustrated, a path of each of the first and second spines 18 and 20 curves around the fastener by 360 degrees from the sharpened end 14 to the driving end 16 although it will be appreciated that the first and second spines 18 and 20 may twist about the shank 12 by other rotation angles as well. Preferably, the twist of the first and second spines 18 and 20 about the shank will be limited to 360 degrees such that the first or second spine 18 or 20 does not overlap upon itself. Accordingly, the angle of inclination 23 of the spines 18 and 20 will be selected so as to permit each of the spines to rotate around the shank by up to 360 degrees along a double-alpha helix path depending upon the length of the fastener 10. As utilized herein, a double-alpha helix path is defined as the path of a pair of paths twisting about the central shank in a continuous right-hand spiral with a smooth constant angle on opposite sides of the shank.

Each spine 18 and 20 may also include a directional self-taping blade 40 comprising a planar member 42 extending radially from the shank 12. The planar member 42 is oriented relative to the shank 12 at an angle corresponding to the angle of inclination 23 of the spines 18 and 20 so as to form a path in the material into which the fastener 10 is to be inserted for the first and second spines 18 and 20 to follow. Each directional self-taping blade 40 includes a leading edge 44 being angled away from the sharpened end 14 of the fastener. The leading edge 44 may optionally be sharpened so as to facilitate insertion of the fastener through the material. As illustrated in FIGS. 4, 5 and 6, the leading edge 44 may be formed between side blade surfaces 48. The side blade surfaces 48 may be continuations with sharpened tip surface 49 as illustrated. The leading edge 44 may be angled by an angle relative to the axis 24 of the shank generally indicated at 46. The leading edge angle 46 may correspond to the angle of the sharpened portion of the shank and be selected to facilitate ease of insertion of the fastener into a material as is commonly known. As described above, the directional self-taping blade 40 cuts a path into the material along a double-alpha helix path about a bore formed by the shank 12 for the first and second spines 18 and 20 to follow.

Figure 2:
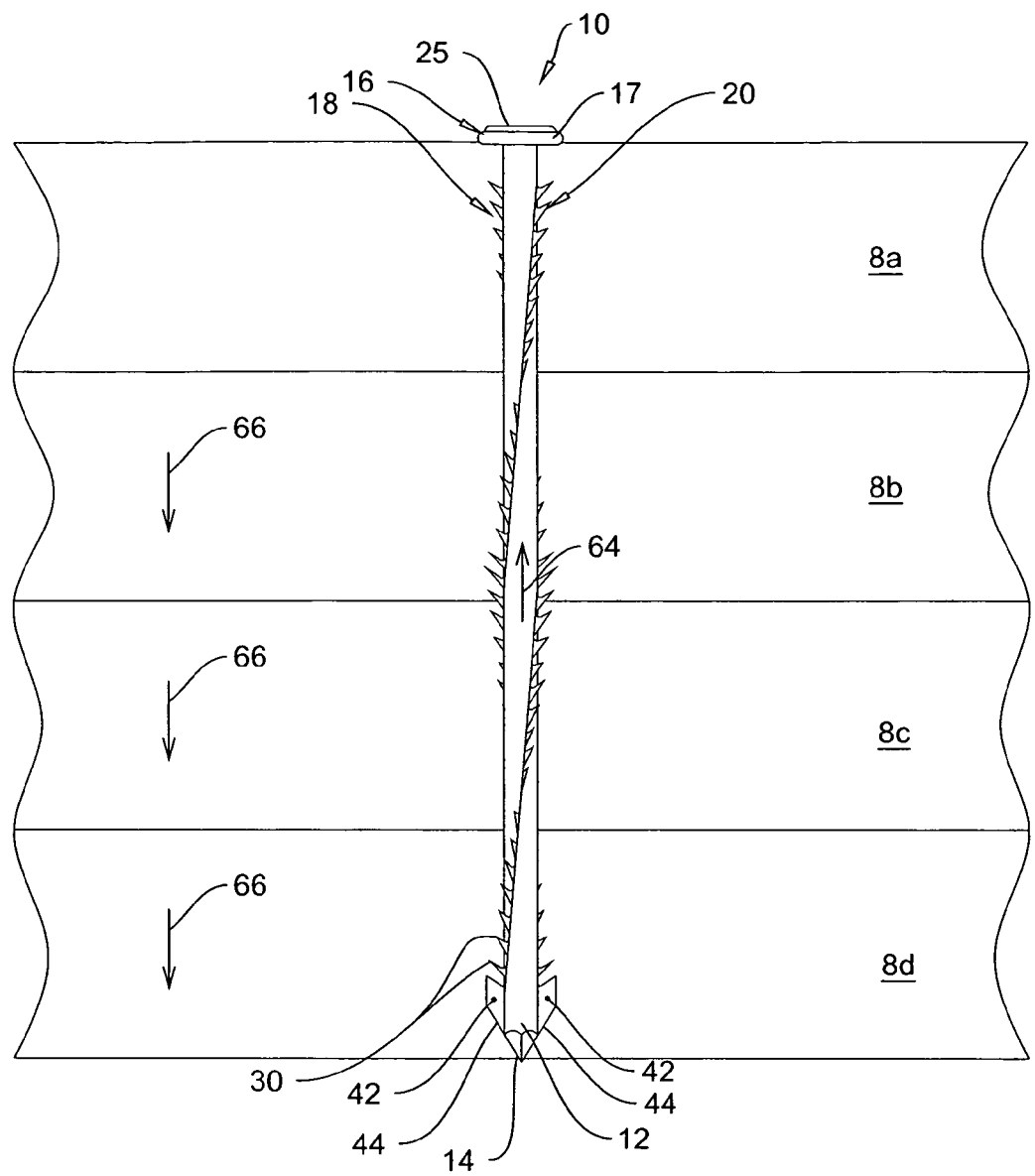
FIG. 2 is a side elevational view of a fastener of FIG. 1 embedded in several boards.

The driving end 16 includes a flattened head portion 17 and an annular shoulder 19 as are conventionally known. The fastener 10 may also include a protrusion or nipple 22 extending axially from the head portion 17. The protrusion 22 may be of a softer material or have less material hardening treatment than the remainder of the fastener such that the protrusion 22 is operable to be sheared off of the head portion 17. The protrusion 22 may also be attached to the head portion 17 by a frangible portion. Upon impact by a hammer or the like, the protrusion 22 will be flattened and sheared from the head portion 17 so as to form a slip washer 25 on the surface thereof as illustrated in FIG. 2. The slip washer 25 formed by the protrusion 22 will reduce the friction between the head portion 17 of the fastener 10 and a driving surface, such as a pneumatic nail gun, hammer, or the like it is driven into a material. It will therefore be seen that the slip washer will therefore reduce the torque imparted to the head portion 17 and will therefore be particularly useful for applications where the fastener 10 is inserted by the use of a nail gun and the like. It will be appreciated that for applications where the fastener 10 is to be driven by a hammer, that the slip washer may not be necessary due to the repeated impacts of the hammer on the head portion 17 of the fastener being for a shorter duration therefore less prone to friction or exertion of a torque on the head.

The fastener 10 may be formed of any known means such as machining, forging or casting. The fastener 10 may be formed of any suitable metal, such as, by way of non-limiting example, mild steel, iron, stainless steel, copper, titanium, or alloys. In particular, one method of forming the present fastener 10 may to be form, by pressing, stamping, extruding from a roll of wire or otherwise forming the shank 12 with opposed side plates 50 extending radially therefrom as illustrated in FIG. 3. Thereafter, excess material or notches 52 may be removed, by cutting, grinding, stamping, pressing or otherwise so as to form the hooks 30 in the side plates 50 as illustrated in FIGS. 3 and 4. The head portion 17 and protrusion 22 may then be formed in driving end 16 by a press or other means as illustrated in FIG. 5. Before, after or concurrently with forming the head portion and nipple, the fastener 10 may be twisted about the shank 12 so as to provide the required twist to the first and second spines 18 and 20. The fastener 10 may also be formed with a twisting side plates 50 thereabout along a double-alpha helix path wherein the spines 18 and 20 and the hooks 30 are formed in the side plates along the double-alpha helix path. Optionally, the fastener 10 may be formed to have the side plates 50 and thereafter the side plates and fastener twisted to follow the double-alpha helix path before the spines and hooks are formed therein.

Turning now to FIGS. 6 and 7, the hooks 30 and spines are formed of a common side plate 50 as described above. The hooks may be formed to have a rearwardly inclined triangular shape having leading and trailing edges, 37 and 39, respectively, and first and second distal pointed ends, 34 and 36, respectively. The spines 18 and 20 and hooks 30 are aligned along and extend radially from the shaft along a longitudinal path 32. The spines and hooks therefore define a plane 33 extending radially from the shank 12 along the path 32 as illustrated in FIG. 7. It will therefore be appreciated that the path of travel 32 and plane 33 follow a double-alpha helix path along the shank 12. As illustrated in FIG. 6 (showing the fastener 10 before a twist is applied to spiral the spines) the first pointed ends 34 of the hooks 30 may be displaced to a first side of the plane 33 while the second pointed ends 36 may be displaced to a second opposed side of the plane 33. The first and second pointed ends 34 and 36 are alternated along the first and second spines 18 and 20. Additionally, FIG. 7 shows the alternating protrusion orientation in greater detail wherein the first and second pointed ends 34 and 36 are disposed to alternating sides of the plane 33. The first and second ends may be arcuately curved out of the plane 33 such that the majority of the protrusions are aligned therewith. The offset to the hooks 30 may be formed during forming of the hooks 30 or at any other time.

The trailing edge 39 of the hooks 30 may be inclined from radial to the shank 12 in a direction towards the driving end 16 of the fastener. Once imbedded within a material, the rearwardly inclined hooks 30 will resist pull out of the fastener and the head portion 17 and will resist further insertion of the fastener thus securing the fastener therein. As illustrated in FIG. 2 wherein the fastener 10 is embedded through first, second, third and fourth boards, 8a, 8b, 8c and 8d, respectively, the hooks 30 will resist any pull out movement of the fastener as indicated generally at 64. In any movement of the fastener in direction 64 relative to one of the boards 8a, 8b, 8c or 8d will cause the hooks 30 to engage with that board and draw the hooks out of the plane 33 in directions 60 and 62. This will further serve to embed the fastener within the material as the fastener is attempted to be drawn backwards. Similarly, if any of the boards 8b, 8c or 8d are drawn downward in directions generally indicated at 66, such as by prying between the boards, the hooks 30 will also be drawn out of plane 33 in directions 60 and 62 to further engage in that board. It will be seen that the first board 8a is maintained fixed with the fastener 10 by the head portion 17 which will bear upon the top surface of the first board. Therefore, any movement between the boards 8a, 8b, 8c and 8d will cause a corresponding movement between the fastener and at least one of those boards and will therefore further engage the hooks 30 in that board.

Thus it will be seen that any attempt to remove the fastener 10 from the boards or to pry the boards apart from each other will server to further engage the hooks 30 within the boards and more securely secure them to each other. Such a fastener may be useful for constructions in locations susceptible to natural disasters and may therefore be useful as a tornado, hurricane or earthquake fastener (T.H.E Fastener).

While specific embodiments of the invention have been described and illustrated, such embodiments should be considered illustrative of the invention only and not as limiting the invention as construed in accordance with the accompanying claims.

What is claimed is:

1. A fastener comprising:
    a central elongate shank extending between first and second ends, said first end of said shank having a tapered point, said second end having a head having an annular shoulder disposed towards said first end;
    an opposed pair of spines extending along the path of a double-alpha helix along said shank; and
    each of said spines including a plurality of rearwardly inclined hooks wherein each of said rearwardly inclined hooks extend from said elongate shank along a common path, each of said rearwardly inclined hooks having a flexible tip curved out of said common path.

2. The fastener of claim 1 wherein each flexible tip of said rearwardly inclined hooks is sharpened.

3. The fastener of claim 2 wherein said spines and said hooks are formed from a planar member, said spines defining a double-alpha helix plane around said shank.

4. The fastener of claim 1 wherein said tips of said plurality of hooks are disposed to opposed alternating sides of said spines.

5. The fastener of claim 1 wherein said spines extend radially from said shank.

6. The fastener of claim 5 wherein said spines have a constant angle of inclination about said shank.

7. The fastener of claim 6 wherein spines include a directional self-tapping blade at a leading edge thereof oriented at an angle corresponding to said angle of inclination about said shank proximate to said first end of said shank.

8. The fastener of claim 7 wherein said spines extend up to substantially 360 degrees around said shank between said first and second ends of said shank.

9. The fastener of claim 1 further including a protrusion extending axially with said shank from said head.

10. The fastener of claim 9 wherein said protrusion is frangibly connected to said head.

11. The fastener of claim 10 wherein said protrusion is formed of a more ductile material than said head.

12. The fastener of claim 11 wherein said protrusion is deformable into an anti-friction slip washer upon impact by a fastener driver.

13. The fastener of claim 12 wherein said washer is separable from said head upon rotation of said shank and head.

* * * * *